(Model.)
F. WATKINS
Box for Holding Ice Cream, &c.
No. 230,452. Patented July 27, 1880.
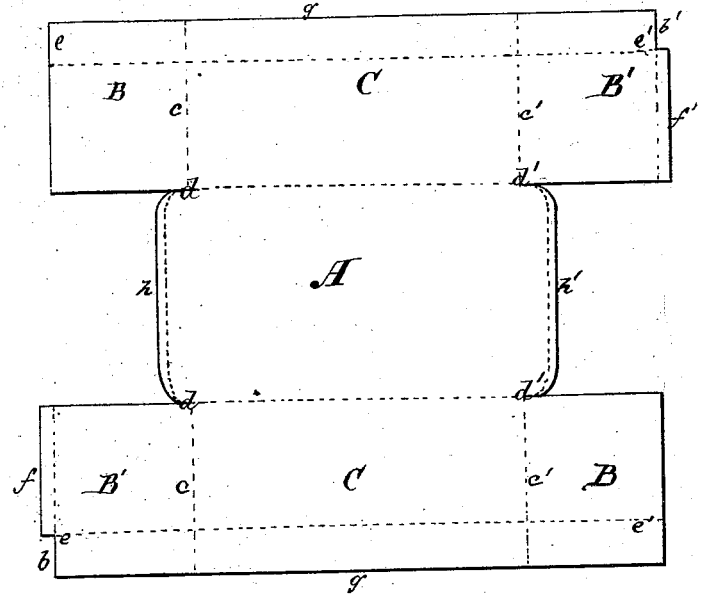
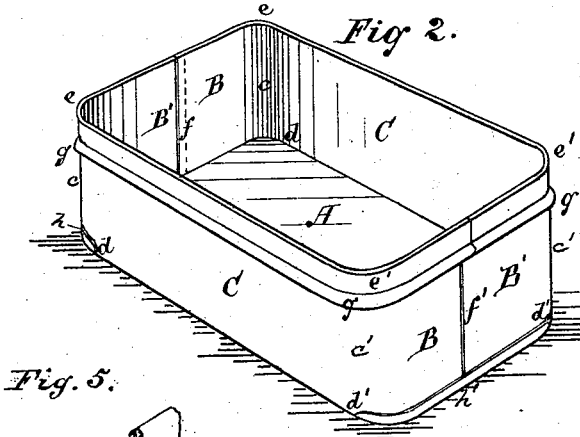
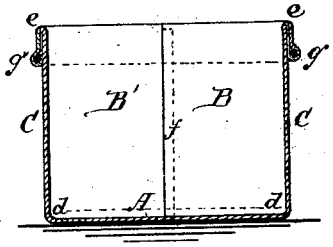
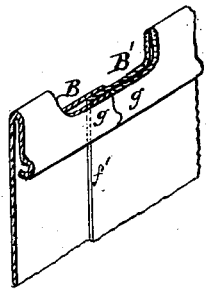
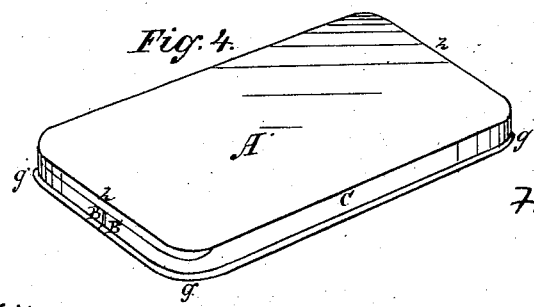
WITNESSES:
Howard F. Struver
J. H. Beatty
Frank Watkins
INVENTOR.

UNITED STATES PATENT OFFICE.

FRANK WATKINS, OF NEW YORK, N. Y.

BOX FOR HOLDING ICE-CREAM, &c.

SPECIFICATION forming part of Letters Patent No. 230,452, dated July 27, 1880.

Application filed April 16, 1880. (Model.)

*To all whom it may concern:*

Be it known that I, FRANK WATKINS, a citizen of the United States, residing at New York, in the State of New York, have invented a new and useful Improvement in Metallic Boxes, of which the following is a specification.

The present invention relates generally to sheet-metal boxes having parallel, or nearly parallel, flat sides, and more particularly to "ice-cream bricks"—that is, boxes in which ice-cream is molded into brick-shaped blocks—and to other soldered tin boxes, which are liable to be impaired by rust when made in the customary manner, owing to the difficulty of thoroughly tinning the inaccessible cut edges at the numerous corner seams in soldering them, the material being iron coated with tin; also, to sheet-metal boxes for uses which demand superior strength.

By my invention I reduce the number of vertical seams in the box or box-cover to two, and locate these at the middle of each end, where they can be readily seen and reached, so as to be effectually soldered. The only horizontal seams are also located at the ends, the box being made from a one-part blank by bending. The terminal edges are turned over outward, so as to bring their cut edges on the outside, and are made to form butt-joints at the ends, and two of the vertical cut edges form external laps, which are tucked under said turned-over edges, so as to be held by them preliminary to soldering, and so as to form smooth and strong vertical seams. The other extremities of said laps I have caused to be held in like manner by the ends of the horizontal portion of the box or box-cover, and said terminal edges of the box have been beaded to form a rest for the cover; but these last two features are not considered essential parts of my invention and may be omitted, or other known expedients may be used instead thereof.

I make my box with either square or rounded corners. The rounded corners are preferable when the box is used as an ice-cream brick, because the cream comes out more easily.

The accompanying drawings, which form a part of this specification, represent a round-cornered ice-cream brick illustrating my invention, like letters of reference indicating corresponding parts in the several figures.

Figure 1 shows a flat piece of sheet metal (by preference tin) cut into proper shape to form the one-part box-body or box. The dotted lines in this figure represent the imaginary lines hereinafter named and the limits of respective portions.

To make the box, the terminal edges $g\ g$ are first turned over outward along imaginary lines $e\ e'\ e\ e'$. The extremities of these edges may be beaded, as shown in Figs. 3 and 5, so as to form a rest for the cover; but this is not an essential part of my invention.

The ends B B′ B B′ are next turned up to a perpendicular position, and lips $h\ h'$ (not essential) are turned up along imaginary lines $d\ d\ d'\ d'$ to support the ends B B′ B B′ externally at the bottom. A is then the bottom of the box, B B′ B B′ are its ends, and C C are its sides.

The end portions B′ B′ are made somewhat longer than B B, so as to lap when both are brought together, as shown at $f\ f'$, while the edges $g\ g$ are cut short, as indicated at $b\ b'$, so as to form butt-joints, said laps $f\ f'$ being tucked beneath said edges at top, as shown in dotted lines at $f$, Fig. 3, and in section at $f'$, Fig. 5.

The folded box is soldered along the lines $d\ d$ and $d'\ d'$ at the bottom and along the joints formed by said laps $f\ f'$, only two solder joints at each end being formed, while only two short cut edges (at the vertical seams) require tinning, and these are central in the respective ends, so as to be easily accessible. The soldering operation finishes the box. Fig. 2 represents the box as it will then appear.

Fig. 3 is a sectional view of the box. The appearance of the sides C C when turned up and of the edges $g\ g$ when turned over is here seen.

Fig. 4 represents the cover of the box, which is made in the same manner as the box itself, turned-over edges $g\ g$ forming the rim of the cover.

Fig. 5 is a sectional perspective view of a fragment of one end of the box, showing more clearly my manner of forming the vertical end seams, by tucking the laps $f\ f'$ beneath the turned-over edges g g, together with the butt-joints of the latter.

I do not claim, broadly, a box made in one piece from sheet metal; and I am aware that one-part paper boxes and box-covers have been made with joints at the ends only. These I do not claim.

I claim as my invention and desire to secure by Letters Patent—

A one-part sheet-metal box or box-cover having vertical sides C C united to its horizontal portion A by bends, vertical ends B B' B B' united to said sides by bent corners, a vertical seam at the middle of each end, terminal edges turned over outward and having butt-joints, and external laps tucked beneath said edges at said vertical seams, substantially as herein specified, for the purposes set forth.

FRANK WATKINS.

Witnesses:
HOWARD F. STREVER,
J. H. BEATTY.